US008862984B1

(12) United States Patent
Thakare et al.

(10) Patent No.: US 8,862,984 B1
(45) Date of Patent: Oct. 14, 2014

(54) DATA CONTRACTS FOR NETWORK PAGE GENERATION CODE

(75) Inventors: Prashant J. Thakare, Mercer Island, WA (US); Andrew S. Huntwork, Seattle, WA (US); Jeremy Boynes, Mercer Island, WA (US); Pravi Garg, Seattle, WA (US); Shashank Shekhar, Karnataka (IN)

(73) Assignee: Amazon Technologies, Inc., Reno, NV (US)

( * ) Notice: Subject to any disclaimer, the term of this patent is extended or adjusted under 35 U.S.C. 154(b) by 159 days.

(21) Appl. No.: 13/363,787

(22) Filed: Feb. 1, 2012

(51) Int. Cl.
*G06F 17/27* (2006.01)

(52) U.S. Cl.
USPC .......................................................... 715/234

(58) Field of Classification Search
USPC .......................................................... 715/234
See application file for complete search history.

(56) References Cited

U.S. PATENT DOCUMENTS

| | | | | |
|---|---|---|---|---|
| 6,904,598 B2 * | 6/2005 | Abileah et al. | ................ | 719/319 |
| 6,990,653 B1 * | 1/2006 | Burd et al. | ................ | 717/108 |
| 7,000,238 B2 * | 2/2006 | Nadler et al. | ................ | 719/330 |
| 7,237,200 B2 * | 6/2007 | Wisniewski | ................ | 715/751 |
| 7,267,275 B2 * | 9/2007 | Cox et al. | ................ | 235/451 |
| 7,392,255 B1 * | 6/2008 | Sholtis et al. | ................ | 1/1 |
| 7,454,508 B2 * | 11/2008 | Mathew et al. | ................ | 709/229 |
| 7,490,331 B2 * | 2/2009 | Beisiegel et al. | ................ | 719/313 |
| 7,587,712 B2 * | 9/2009 | Mountain et al. | ............ | 717/148 |
| 7,698,398 B1 * | 4/2010 | Lai | ................ | 709/223 |
| 2002/0178214 A1 * | 11/2002 | Brittenham et al. | ......... | 709/203 |
| 2003/0033369 A1 * | 2/2003 | Bernhard | ................ | 709/203 |
| 2003/0120593 A1 * | 6/2003 | Bansal et al. | ................ | 705/39 |
| 2004/0010598 A1 * | 1/2004 | Bales et al. | ................ | 709/228 |
| 2005/0044197 A1 * | 2/2005 | Lai | ................ | 709/223 |
| 2005/0187930 A1 * | 8/2005 | Subramanian et al. | .......... | 707/4 |
| 2006/0069774 A1 * | 3/2006 | Chen et al. | ................ | 709/225 |
| 2011/0277027 A1 * | 11/2011 | Hayton et al. | ................ | 726/8 |

OTHER PUBLICATIONS

Kochmer et al.; JSP and XML Integrating XML and Web Services in Your JSP Application; Mar. 19, 2002; Addison-Wesley Professional; pp. 214-228 and 287-308.*
WSDL Types Element; Feb. 8, 2007; Tutorial Point; pp. 1-2.*
JSP Globalization Support; 2002; Oracle.com; pp. 1-6.*
RightNow Connect Web Services for Soap; 2010; RightNow Technologies, Inc., pp. 1-2.*
Building a Report with Aggregate Data; 2002; Oracle.com, pp. 1-9.*
Ryan et al.; "Request for Comments: 2713, Schema for Representing Java(tm) Objects in an LDAP Directory;" Oct. 1999; The Internet Society; pp. 1-21.*
"Introduction to Client/Server Fundamentals;" Client/Server Fundamentals; Feb. 8, 1999; Network Computing; pp. 1-9.*

(Continued)

*Primary Examiner* — Andrew Dyer

(74) *Attorney, Agent, or Firm* — Thomas | Horstemeyer, LLP

(57) ABSTRACT

Disclosed are various embodiments for using data contracts in connection with network page generation code. A network page request is obtained from a client. Data is aggregated from multiple data sources in response to the request, and data is marshalled based at least in part on a data contract. Page generation code is executed to generate at least a portion of the network page in response to the request. The aggregated data is provided to the page generation code as one or more predefined variables. Access to the predefined variables by the page generation code complies with the data contract.

21 Claims, 5 Drawing Sheets

(56) References Cited

OTHER PUBLICATIONS

U.S. Appl. No. 13/363,761 entitled "Multipart encoding in data aggregation for network page generation, " filed Feb. 1, 2012.
U.S. Appl. No. 13/363,770 entitled "Loading Customer-Supplied Network Page Generation Code," filed Feb. 1, 2012.
U.S. Appl. No. 13/348,069 entitled "Securing Execution of Customer-Supplied Network Page Generation Code," filed Jan. 11, 2012.
U.S. Appl. No. 13/363,782 entitled "Error Handling in a Network Page Generation Environment," filed Feb. 1, 2012.
U.S. Appl. No. 13/363,816 entitled "Network Site Hosting in a Managed Environment," filed Feb. 1, 2012.
U.S. Appl. No. 13/348,051 entitled "Generating Network Pages Using Customer-Supplied Generation Code, " filed Jan. 11, 2012.
U.S. Appl. No. 13/348,088 entitled "Facilitating Access to Data in Network Page Generation Code," filed Jan. 11, 2012.
U.S. Appl. No. 13/348,081 entitled "Virtual File System for Hosted Network Sites," filed Jan. 11, 2012.
U.S. Appl. No. 13/348,059 entitled "Generating Network Pages Using Customer-Generated Network Page Portions, " filed Jan. 11, 2012.
U.S. Appl. No. 13/347,953 entitled "Opportunistic Unloading of Network Applications," filed Jan. 11, 2012.

* cited by examiner

DATA CONTRACTS FOR NETWORK PAGE GENERATION CODE

BACKGROUND

A data type is a classification for a data item that may identify the possible values for the data item, the possible operations on the data item, the meaning of the data item, and other information about the data item. Examples of data types may include Boolean, floating point, integer, character, character string, and so on. In a manifestly typed programming language, the developer explicitly specifies the data type for the data item in the code. In a type-inferred programming language, the compiler may infer the data type according to the context of how the data item is used in the code. Typed programming languages may be statically typed or dynamically typed. In static typing, all data items have their types determined prior to runtime, e.g., at compile time or another time. In dynamic typing, types are determined at runtime.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing data contracts for use with network page generation code. A hosting provider may offer network site hosting for a plurality of customers. Such hosting may include access to an electronic commerce platform or other hosted application. For security and other various reasons, customer-supplied network page generation code may be executed under a framework that restricts the operations permitted in the code. Also, the page generation code may be restricted from directly accessing data sources of the electronic commerce platform. To provide access, data from the electronic commerce platform that is used by the page generation code may be aggregated from one or more data sources in advance for use by the page generation code. This aggregated data may be provided to the page generation code through predefined variables.

Various techniques relating to a data aggregation framework are provided in U.S. patent application Ser. No. 13/348,051 entitled "GENERATING NETWORK PAGES USING CUSTOMER-SUPPLIED GENERATION CODE" and filed on Jan. 11, 2012, and in U.S. patent application Ser. No. 13/348,059 entitled "GENERATING NETWORK PAGES USING CUSTOMER-GENERATED NETWORK PAGE PORTIONS" and filed on Jan. 11, 2012, both of which are incorporated herein by reference in their entirety.

Documentation may be provided to the customers in order to assist them in developing page generation code for their network sites under this framework. The documentation may take the form of an example, as in sample or default page generation code, and/or other written documentation. One form of documentation may be a data contract, which is a formal agreement between a service and a client regarding data that is to be exchanged. The data contract may establish naming conventions for the data, data types for the data, subcomponents for the data, and/or other parameters for the data.

Various embodiments of the present disclosure employ such data contracts to validate customer-submitted page generation code, to marshal and unmarshal data, and for other purposes. By providing the data contracts to the customer as a form of application programming interface (API) documentation, the customer-supplied page generation code is developed consistent with internal subsystems that perform, for example, code validation, data serialization/marshalling, and/or other functions according to the same data contracts. In the following discussion, a general description of the system and its components is provided, followed by a discussion of the operation of the same.

Figure 1:
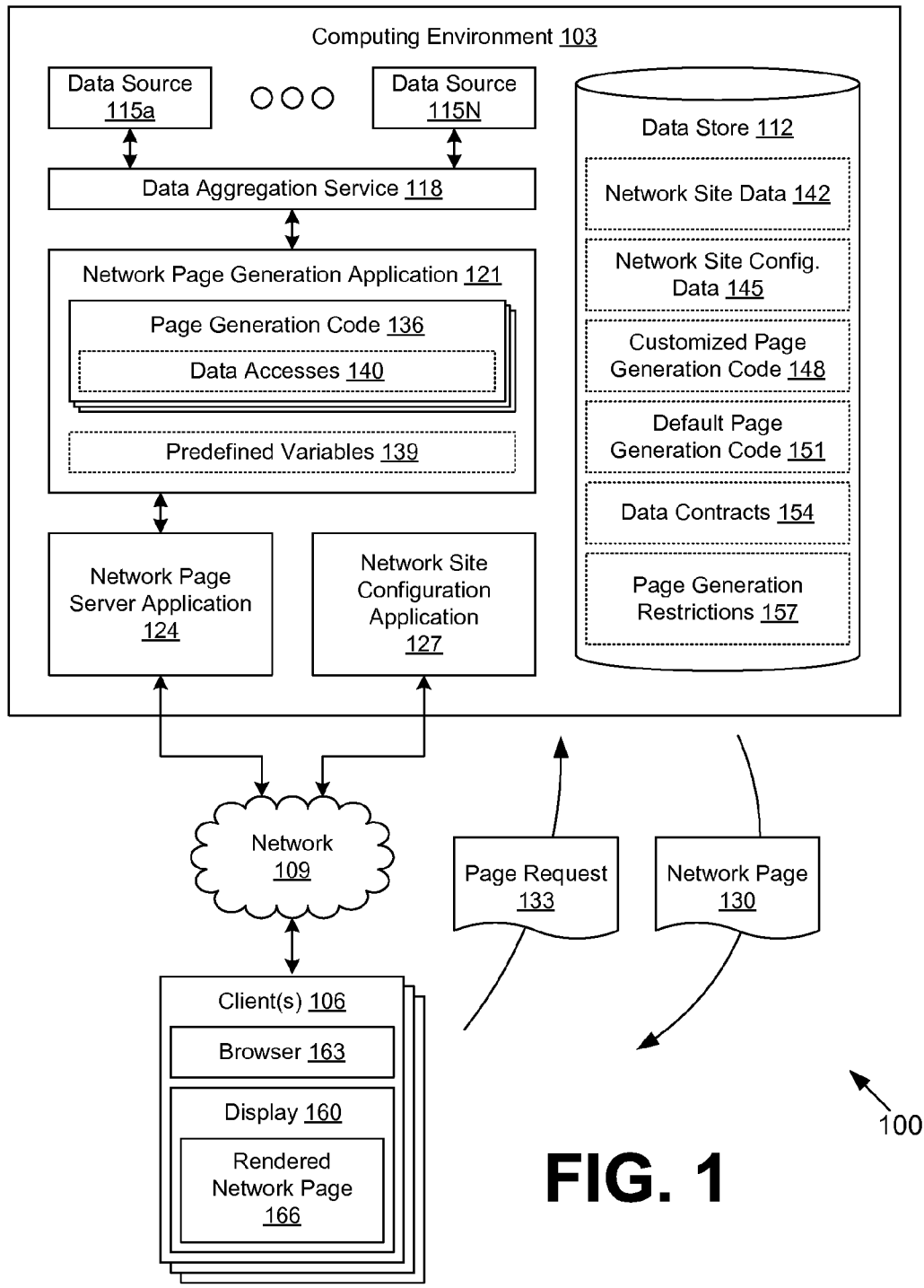
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations. The computing environment 103 may be operated by a hosting provider to host network sites for various customers.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed by the computing environment 103, for example, include a plurality of data sources 115a . . . 115N, a data aggregation service 118, a network page generation application 121, a network page server application 124, a network site configuration application 127, and other applications, services, processes, systems, engines, or functionality not discussed in detail herein. The data sources 115 are executed to provide various data used in generating network pages 130 for network sites of customers of the hosting provider. Where the customers are merchants, the data provided by the data sources 115 may relate to electronic commerce data such as, for example, item catalog data, item suggestions data, shopping cart data, checkout data, order data, and so on. In one embodiment, the data sources 115 may comprise web services. In another embodiment, the data sources 115 may comprise files or other forms of data stores. The data sources 115 may be configured to marshal the data (i.e., serialize the data) according to predefined data contracts. As used herein, "marshalling" refers to the process of transforming the memory representation of an object to a data format suitable for storage or transmission.

The data aggregation service 118 is executed to aggregate data from the data sources 115 for use in generation of network pages 130. The data aggregation service 118 may employ parallel fetching to reduce latency when data is aggregated from multiple data sources 115. The network page generation application 121 is executed to generate the network pages 130 in response to page requests 133 obtained from clients 106. The network pages 130 may correspond to web pages, gopher pages, mobile application screens, and/or other forms of network content. The data aggregation service 118 may be configured to unmarshal the data obtained from the data sources 115 using a predefined data contract. In some embodiments, the data aggregation service 118 may marshal the data using a predefined data contract for sending to the network page generation application 121.

Where the customer is a merchant, the network pages 130 may correspond to home pages, catalog pages, item detail pages, shopping cart pages, checkout pages, order confirmation pages, and so on. Such network pages 130 may facilitate selecting items for purchase, rental, download, lease, or other form of consumption. In addition, where the customer is a merchant, the network page generation application 121 may include, or be in communication with, an electronic commerce system that performs various backend functions in order to facilitate the online purchase of items.

The network page generation application 121 may execute page generation code 136 in order to generate the network pages 130. The page generation code 136 may correspond to a default version supplied by the hosting provider or may correspond to a customized version supplied by the customer. In some cases, the page generation code 136 may be transformed or compiled from one code format to another and/or may be interpreted. As a non-limiting example, the page generation code 136 may correspond to JavaServer Pages (JSPs), which may be compiled into Java® servlets, which in turn may be compiled into bytecode which may be executable by the network page generation application 121. To this end, the network page generation application 121 may include a servlet container such as Apache® Tomcat® or another servlet container.

The network page generation application 121 may be configured to obtain aggregated data from the data aggregation service 118 and to provide the aggregated data to the page generation code 136, for example, as a set of predefined variables 139 or by another approach. The network page generation application 121 may include one or more data accesses 140 to the predefined variables 139. The data accesses 140 may be evaluated for compliance with a predefined data contract. The network page generation application 121 may act as a "sandbox" for the page generation code 136 to enforce restrictions on application programming interface (API) calls, access to the data source 115, and/or other resources in the computing environment 103.

The network page server application 124 is configured to obtain the page requests 133 from the client 106 over the network 109, to generate network pages 130 in response to the page requests 133 using the network page generation application 121, and to return the network pages 130 to the client 106 by way of the network 109. The network page server application 124 may correspond to a commercially available hypertext transfer protocol (HTTP) server such as, for example, Apache® HTTP Server, Apache® Tomcat®, Microsoft® Internet Information Services (IIS), and/or other servers.

The network site configuration application 127 is executed to facilitate customer configuration of network sites. To this end, the network site configuration application 127 may enable uploading and configuration of the page generation code 136, configuration of various parameters associated with the operation of the network site, order fulfillment management, item catalog management, and/or other functionality. The network site configuration application 127 may be configured to evaluate the customer-supplied page generation code 136 for compliance with predefined data contracts. The network site configuration application 127 may implement an HTTP server, a web-based distributed authoring and versioning (WebDAV) server, a file transfer protocol (FTP) server, and/or other servers.

The data stored in the data store 112 includes, for example, network site data 142, network site configuration data 145, customized page generation code 148, default page generation code 151, data contracts 154, page generation restrictions 157, and potentially other data. The network site data 142 corresponds to data used in the generation of the network pages 130 for the hosted network sites of the merchants or other customers. Such data may include, for example, templates, hypertext markup language (HTML), text, extensible markup language (XML), cascading style sheets (CSS), images, audio, video, animations, and/or other data.

The network site configuration data 145 may store parameters and/or other data for controlling the operation and appearance of the hosted network site. Such data may control various electronic commerce functionality such as, for example, item catalogs, item taxonomies, item searching, item recommendations, shopping carts, checkout, order fulfillment, and/or other functionality. The customized page generation code 148 corresponds to page generation code 136 which is created or customized by merchants or other customers. The default page generation code 151 may correspond to a default set of page generation code 136 for a merchant or other customer to use for a base functionality for a network site. The default page generation code 151 may generate network pages 130 having, for example, a default appearance and behavior for a generic electronic commerce site.

The data contracts 154 may correspond to the predefined data contracts which are used to determine whether the data accesses 140 to the predefined variables 139 in the page generation code 136 are in compliance, to marshal or unmarshal data, and/or for other internal purposes in the computing environment 103. The data contracts 154 may be provided to the customers as documentation for use in developing the page generation code 136. As a non-limiting example, the data contracts 154 may comprise web services description language (WSDL), extensible markup language (XML)

schema, data definition markup language (DDML), document schema description languages (DSDL), document structure description (DSD), and/or other data description languages. In some embodiments, the data contracts 154 may be used to provide manifest typing to a non-manifestly typed language, static typing to a dynamically typed language, and so on. For example, the data contracts 154 may be used to provide static, manifest typing for data accesses 140 to the predefined variables 139 in expression language (EL) expressions in JSP. Additionally, the data contracts 154 may include developer documentation such as, for example, names of predefined variables 139, listing of the associated data types, instructions, explanations, and so on regarding use of the data specified by the data contracts 154.

The page generation restrictions 157 may configure various restrictions to be placed on the page generation code 136 by the network page generation application 121. As a non-limiting example, where the page generation code 136 corresponds to JSP code, the network page generation application 121 may restrict the JSP code from including scriptlets and/or various API calls. Various functionalities may be whitelisted or blacklisted, as the case may be. Such restrictions may be configured by way of parameters in the page generation restrictions 157.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 160. The display 160 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 163 and/or other applications. The browser 163 may be executed in a client 106, for example, to access and render network pages 130 served up by the computing environment 103 and/or other servers, thereby generating a rendered network page 166 on the display 160. The client 106 may be configured to execute applications beyond the browser 163 such as, for example, code development applications, file transfer applications, mobile applications, email applications, instant message applications, and/or other applications.

Next, a general description of the operation of the various components of the networked environment 100 is provided. To begin, a merchant or other customer of a hosting provider associated with the computing environment 103 configures a network site to be hosted through the computing environment 103. The network site may have a common domain that is shared by multiple customers of the hosting provider, or the network site may correspond to a unique domain for each customer. The merchant or other customer may adopt default page generation code 151 for various network pages 130 accessible through the network site. Alternatively, or additionally, the merchant or other customer may create customized page generation code 148 for generating some or all of the network pages 130 accessible through the network site. The data contracts 154 may be provided to the customers as a form of documentation.

The merchant or other customer may interact with the network site configuration application 127 to customize or make changes to the network site. In various cases, the customer may edit the page generation code 136 directly through the network site configuration application 127, or the customer may upload replacement page generation code 136. Through this system, customers are able to control generation of network pages 130 for their network sites, despite using a hosted infrastructure and potentially a hosted electronic commerce platform.

The page generation code 136 is able to access aggregated data generated by the data aggregation service 118. The set of data that is available and the data contract 154 that is used may depend on the type of network page 130, e.g., whether the network page 130 is a checkout page, catalog page, order confirmation page, and so on. In one example, the predefined variables 139 may be associated with the hosted electronic commerce platform provided by the hosting provider. The predefined variables 139 may correspond to implicit variables or other variables that are available in the scope of the page generation code 136. The page generation code 136 may be configured to access all of the predefined variables 139 or a subset of the predefined variables 139. The page generation code 136 may be restricted from accessing the data sources 115 directly.

In various embodiments, the data accesses 140 in the page generation code 136 may be evaluated with compliance with the corresponding data contract 154 before runtime or at runtime. Where the page generation code 136 is compiled, the page generation code 136 may be evaluated for compliance with the data contract 154 before compile time. The page generation code 136 may be evaluated to ensure that use of the predefined variables 139 by the data accesses 140 are consistent with data types defined in the data contract 154.

As a non-limiting example, an EL expression "${itemName+3}," which applies an arithmetic operator to the predefined variable 139 of "itemName," may be flagged as non-compliant where "itemName" is defined in the data contract 154 as a character string. It is noted that the page generation code 136 in this case may contain no reference to "itemName" before the example EL expression because "itemName" may be an implicit variable. Thus, various embodiments allow for pre-runtime type checking to be applied using the data contract 154 in a situation and language not otherwise providing for such type checking.

In operation, the client 106 sends a page request 133 to the network page server application 124 for some network page 130 from a network site of a customer. The network site is hosted on behalf of the customer by the hosting provider who operates the computing environment 103. Where the customer is a merchant, the hosting provider may operate a hosted electronic commerce platform in conjunction with the computing environment 103. The page request 133 is provided to the network page generation application 121, which then obtains the aggregated data from the data aggregation service 118. The aggregation may be performed automatically in response to the page request 133 or in advance of the page request 133. The data aggregation service 118 fetches the aggregated data from one or more data sources 115. The aggregated data may be marshalled and unmarshalled according to the data contract 154.

The page generation code 136 for the requested network page 130 is executed by the network page generation application 121. The network page generation application 121 facilitates access to the aggregated data by the page generation code 136 by way of the predefined variables 139. The page generation code 136 generates the network page 130, and the network page server application 124 serves up the network page 130 to the client 106 in response to the page request 133.

In some embodiments, the page generation code 136 is restricted from accessing one or more of the data sources 115. The customer-supplied page generation code 136 may be isolated from one or more of the data sources 115 for purposes of complying with PCI DSS and/or other security standards. Consequently, the data from the data sources 115 may be accessible only as the predefined variables 139. It is noted that the data aggregation service 118 may generate the aggregated data in response to the page request 133, in response to other events, or at other times as desired.

The page generation code 136 may be analyzed for compliance with one or more policies according to the page generation restrictions 157 when initially configured or compiled and/or at runtime. Such policies may include acceptable content of the network page 130, API usage, usage of scriptlets or other disallowed language features, and so on. If the page generation code 136 is determined to be non-compliant, the page generation code 136 may be unexecuted, terminated if already executing, replaced with default page generation code 151, or another action may be taken.

Figure 2:
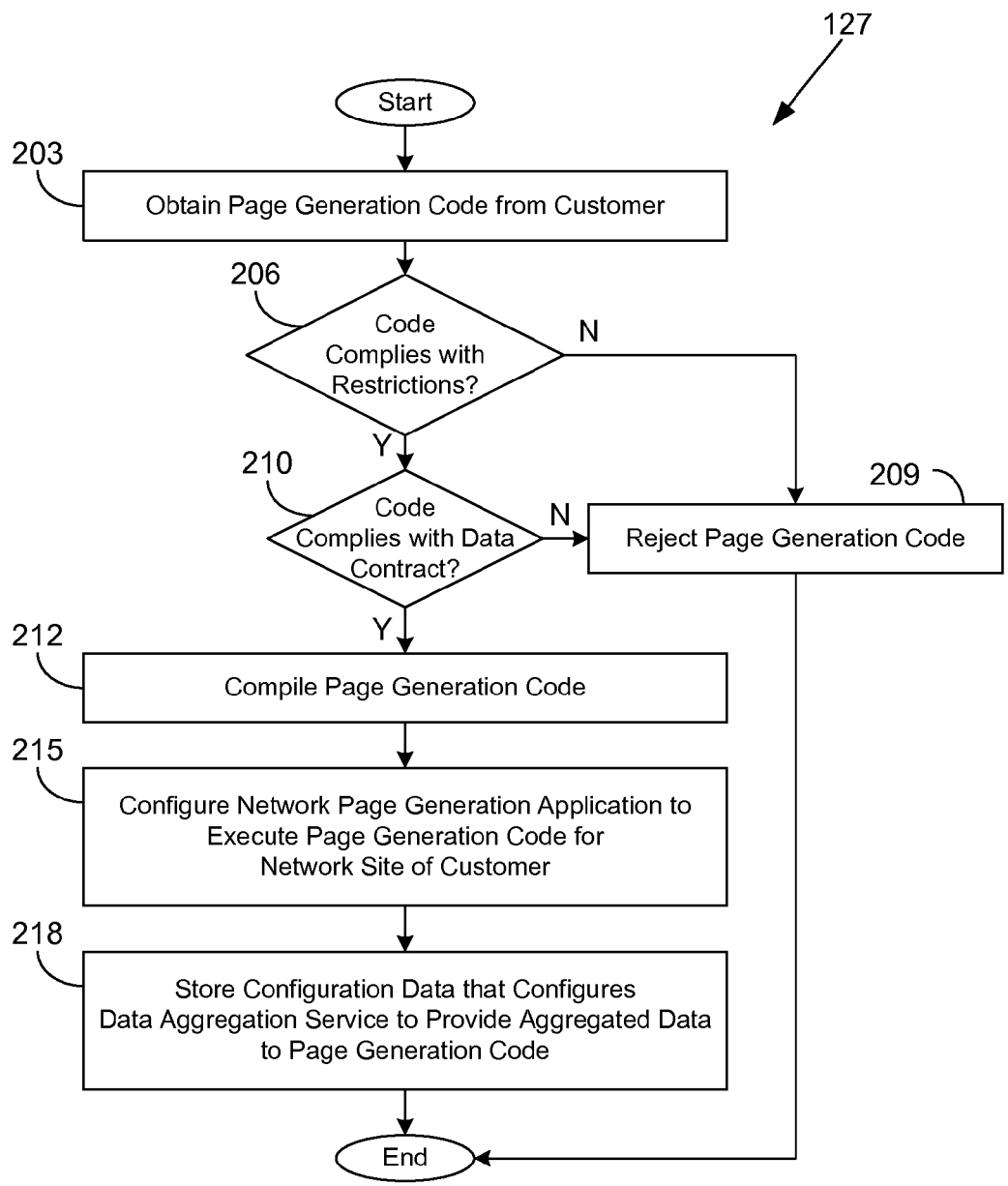
FIG. 2 is a flowchart illustrating one example of functionality implemented as portions of a network site configuration application executed in a computing environment in the networked environment of FIG. 1 according to various embodiments of the present disclosure.

Referring next to FIG. 2, shown is a flowchart that provides one example of the operation of a portion of the network site configuration application 127 according to the embodiments discussed in connection with FIG. 1. It is understood that the flowchart of FIG. 2 provides merely an example of the many different types of functional arrangements that may be employed to implement the operation of the portion of the network site configuration application 127 as described herein. As an alternative, the flowchart of FIG. 2 may be viewed as depicting an example of steps of a method implemented in the computing environment 103 (FIG. 1) according to one or more embodiments.

Beginning with box 203, the network site configuration application 127 obtains page generation code 136 (FIG. 1) from a customer whose network site is hosted by the hosting provider who operates the computing environment 103. The network site configuration application 127 may be configured to authenticate a client 106 (FIG. 1) associated with the customer. In box 206, the network site configuration application 127 determines whether the page generation code 136 complies with the page generation restrictions 157 (FIG. 1). If the page generation code 136 does not comply with the page generation restrictions 157, the network site configuration application 127 rejects the page generation code 136 in box 209. An error may be presented to the customer. Thereafter, the portion of the network site configuration application 127 ends.

If the page generation code 136 complies with the page generation restrictions 157, the network site configuration application 127 proceeds from box 206 to box 210. Even assuming that the page generation code 136 is determined to be valid by the network site configuration application 127, validity checks may still need to be performed by the network page generation application 121 (FIG. 1) at runtime. In box 210, the network site configuration application 127 determines whether the page generation code 136 complies with a corresponding data contract 154 (FIG. 1) for the page generation code 136. To this end, the network site configuration application 127 determines whether one or more data accesses 140 (FIG. 1) to the predefined variables 139 (FIG. 1) comply with the data contract 154.

If the page generation code 136 does not comply with the data contract 154, the network site configuration application 127 moves from box 210 to box 209. In box 209, the network site configuration application 127 rejects the page generation code 136. An error may be presented to the customer. Thereafter, the portion of the network site configuration application 127 ends. If, instead, the page generation code 136 does comply with the data contract 154, the network site configuration application 127 proceeds from box 210 to box 212.

In box 212, the network site configuration application 127 compiles the page generation code 136. For example, the network site configuration application 127 may compile the page generation code 136 from a JSP into a servlet. The resulting servlet code may also be compiled into bytecode for execution by a Java® Virtual Machine (JVM) or directly by a processor circuit of the computing environment 103.

In box 215, the network site configuration application 127 configures the network page generation application 121 to execute the compiled page generation code 136 for one or more network pages 130 (FIG. 1) for the network site of the customer. In box 218, the network site configuration application 127 may store configuration data that configures the data aggregation service 118 (FIG. 1) to provide a set of predefined variables 139 to the page generation code 136. Thereafter, the portion of the network site configuration application 127 ends.

Figure 3:
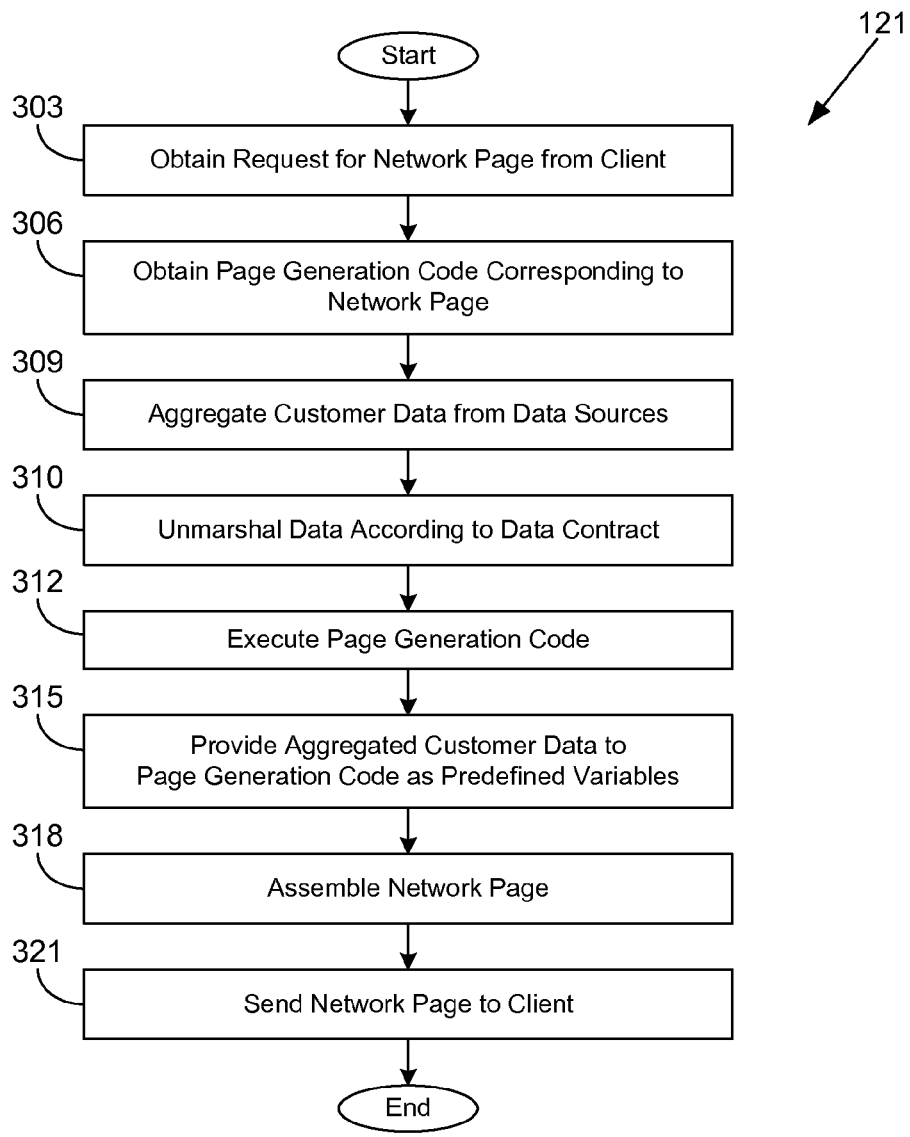
FIG. 3 is a flowchart illustrating one example of functionality implemented as portions of a network page generation application executed in a computing environment in the networked environment of FIG. 1 according to various embodiments of the present disclosure.

Continuing on to FIG. 3, shown is a flowchart that provides one example of the operation of a portion of the network page generation application 121 according to the embodiments discussed in connection with FIG. 1. It is understood that the flowchart of FIG. 3 provides merely an example of the many different types of functional arrangements that may be employed to implement the operation of the portion of the network page generation application 121 as described herein. As an alternative, the flowchart of FIG. 3 may be viewed as depicting an example of steps of a method implemented in the computing environment 103 (FIG. 1) according to one or more embodiments.

Beginning with box 303, the network page generation application 121 obtains a page request 133 (FIG. 1) from the client 106 (FIG. 1) by way of a network page server application 124 (FIG. 1). The page request 133 indicates a network page 130 (FIG. 1) from a network site of a customer. The network site is hosted by the hosting provider who operates the computing environment 103. In box 306, the network page generation application 121 obtains or fetches page generation code 136 (FIG. 1) corresponding to the requested network page 130.

In box 309, the network page generation application 121 aggregates various data pertaining to the customer from one or more data sources 115 (FIG. 1) by way of the data aggregation service 118 (FIG. 1). The data complies with one or more data contracts 154 (FIG. 1). In box 310, the network page generation application 121 unmarshals the data obtained from the data aggregation service 118 using one or more data contracts 154. In some embodiments, the unmarshalling may be performed by the data aggregation service 118.

In box 312, the network page generation application 121 executes the page generation code 136. In doing so, the network page generation application 121 may perform various runtime checks to ensure that the page generation code 136 does not include any impermissible code or content. In box 315, the network page generation application 121 provides the aggregated data to the page generation code 136 as predefined variables 139 (FIG. 1).

In box 318, the network page generation application 121 assembles the network page 130 using the output of the page generation code 136 and potentially other data. In box 321, the network page generation application 121 sends the generated network page 130 to the client 106 in response to the page request 133. Thereafter, the portion of the network page generation application 121 ends.

Figure 4:
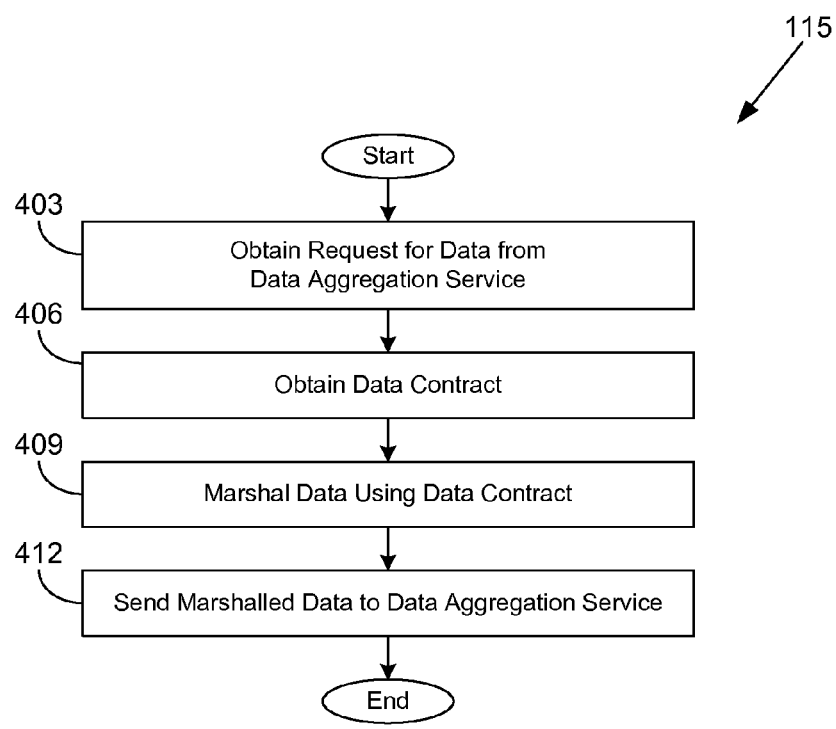
FIG. 4 is a flowchart illustrating one example of functionality implemented as portions of a data source executed in a computing environment in the networked environment of FIG. 1 according to various embodiments of the present disclosure.

Moving on to FIG. 4, shown is a flowchart that provides one example of the operation of a portion of the data source 115 according to various embodiments. It is understood that the flowchart of FIG. 4 provides merely an example of the many different types of functional arrangements that may be employed to implement the operation of the portion of the data source 115 as described herein. As an alternative, the flowchart of FIG. 4 may be viewed as depicting an example of steps of a method implemented in the computing environment 103 (FIG. 1) according to one or more embodiments.

Beginning with box 403, the data source 115 obtains a request for data from the data aggregation service 118 (FIG. 1). In box 406, the data source 115 obtains a data contract 154 (FIG. 1). The data contract 154 may be provided along with the data request or may be obtained by the data source 115 from a data store 112 (FIG. 1). In one embodiment, the data source 115 is operated by an entity external to the data aggregation service 118. Consequently, the data source 115 may employ an external data contract 154 which may be incorporated within an internal data contract 154 employed by the data aggregation service 118, the network page generation application 121 (FIG. 1), the network site configuration application 127 (FIG. 1), and/or other components.

In box 409, the data source 115 marshals the requested data using the data contract 154. In box 412, the data source 115 sends the marshalled data to the data aggregation service 118. Thereafter, the portion of the data source 115 ends.

Figure 5:
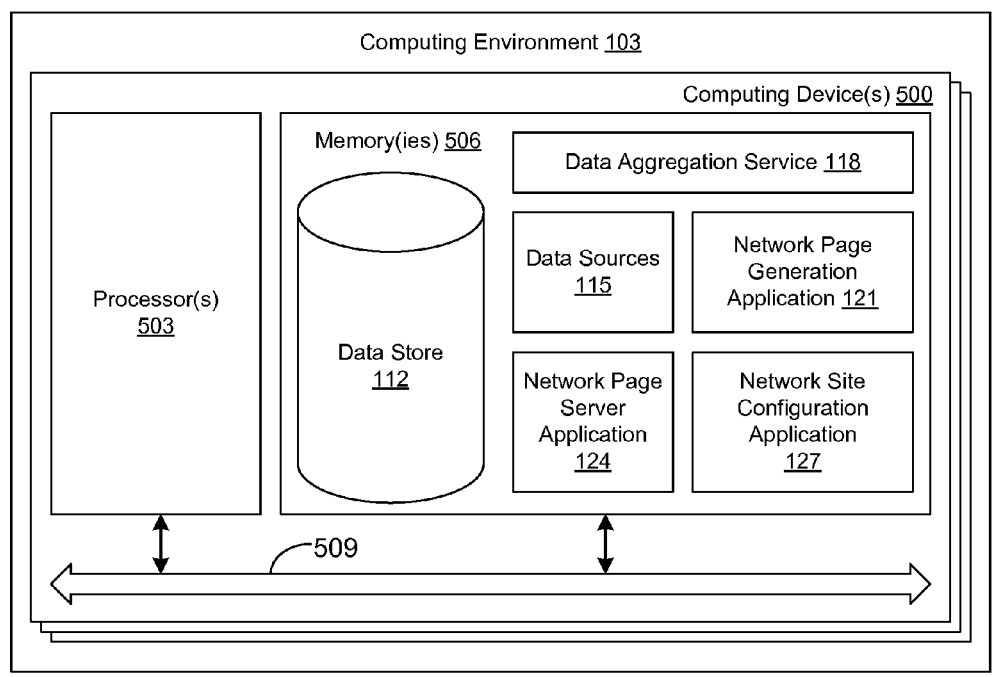
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 500. The computing device 500 corresponds to a representative computing device which may be employed in the computing environment 103.

The computing device 500 includes at least one processor circuit, for example, having a processor 503 and a memory 506, both of which are coupled to a local interface 509. To this end, the computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the data aggregation service 118, the data sources 115, the network page generation application 121, the network page server application 124, the network site configuration application 127, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the data aggregation service 118, the data sources 115, the network page generation application 121, the network page server application 124, the network site configuration application 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-4 show the functionality and operation of an implementation of portions of the network site configuration application 127, the network page generation application 121, and the data source 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data aggregation service 118, the data sources 115, the network page generation application 121, the network page server application 124, and the network site configuration application 127, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system.

In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   at least one application executable in the at least one computing device, the at least one application comprising:
   logic that, in response to receiving a request for a network page from a client, aggregates data from a plurality of data sources in response to the request, wherein the data complies with a data contract;
   logic that marshals or unmarshals the data based at least in part on the data contract; and
   logic that executes page generation code to generate at least a portion of the network page in response to the request, the page generation code being restricted from directly accessing the plurality of data sources, wherein the data is provided to the page generation code as at least one predefined variable, the data contract defines a corresponding data type for individual ones of the at least one predefined variable, the page generation code comprises a non-manifestly typed language, and access to the at least one predefined variable by the page generation code complies with the data contract.

2. The system of claim 1, wherein at least one of the plurality of data sources is configured to marshal a respective portion of the data based at least in part on an external data contract, and the data contract includes the external data contract.

3. The system of claim 1, wherein the network page is associated with a network site that is hosted by a hosting provider on behalf of a customer, and the page generation code is supplied by the customer.

4. The system of claim 1, wherein the at least one application further comprises logic that determines whether the access to the at least one predefined variable by the page generation code complies with the data contract before the page generation code is executed.

5. The system of claim 4, wherein the at least one application further comprises logic that generates an error in response to determining that the access to the at least one predefined variable does not comply with the data contract.

6. The system of claim 4, wherein the at least one application further comprises logic that compiles the page generation code to a compiled format in response to determining that the access to the at least one predefined variable complies with the data contract.

7. The system of claim 1, wherein the page generation code comprises JavaServer Pages (JSP) code, and the data contract comprises web services description language (WSDL).

8. A method, comprising:
   receiving, via at least one of one or more computing devices, page generation code from a customer of a hosting provider, the page generation code including at least one access to at least one predefined variable and being restricted from directly accessing a plurality of data sources, the page generation code comprising a non-manifestly typed language;
   determining, via at least one of the one or more computing devices, whether the at least one access to the at least one predefined variable complies with a data contract established by the hosting provider before the page generation code is executed, the data contract defining a corresponding data type for individual ones of the at least one predefined variable;

configuring, via at least one of the one or more computing devices, a network page generation application to use the page generation code to generate at least a portion of a network page for a network site hosted by the hosting provider on behalf of the customer in response to determining that the at least one access to the at least one predefined variable complies with the data contract; and marshalling or unmarshalling, via at least one of the one or more computing devices, data based at least in part on the data contract.

9. The method of claim 8, wherein configuring the network page generation application further comprises compiling, via at least one of the one or more computing devices, the page generation code to a compiled format.

10. The method of claim 8, wherein the page generation code comprises JavaServer Pages (JSP) code, and the data contract comprises web services description language (WSDL).

11. The method of claim 8, wherein the network page generation application comprises a servlet container.

12. The method of claim 8, wherein determining whether the at least one access to the at least one predefined variable complies with the data contract further comprises evaluating, via at least one of the one or more computing devices, whether the at least one access to the at least one predefined variable complies with the corresponding data type for the at least one predefined variable defined by the data contract.

13. The method of claim 8, further comprising:

receiving, via at least one of the one or more computing devices, a request for the network page from a client;

aggregating, via at least one of the one or more computing devices, the data from the plurality of data sources, wherein the data complies with the data contract;

executing, via at least one of the one or more computing devices, the page generation code to generate the at least a portion of the network page, wherein the data is provided to the page generation code as the at least one predefined variable; and sending, via at least one of the one or more computing devices, the network page to the client.

14. The method of claim 13, further comprising marshalling, via at least one of the one or more computing devices, the data based at least in part on the data contract.

15. The method of claim 13, further comprising unmarshalling, via at least one of the one or more computing devices, the data based at least in part on the data contract.

16. The method of claim 8, wherein at least one of the plurality of data sources is configured to marshal a respective portion of the data based at least in part on an external data contract, and the data contract includes the external data contract.

17. A non-transitory computer-readable medium embodying at least one program executable in a computing device, the at least one program comprising:

code that, in response to receiving page generation code from a customer of a hosting provider, the page generation code including at least one access to at least one predefined variable and being restricted from directly accessing a plurality of data sources, determines whether the at least one access to the at least one predefined variable complies with a data contract established by the hosting provider before the page generation code is compiled;

code that compiles the page generation code into a compiled format in response to determining that the at least one access to the at least one predefined variable complies with the data contract;

code that, in response to receiving a request for a network page from a client, the network page being associated with a network site hosted by the hosting provider on behalf of the customer, aggregates data from the plurality of data sources, wherein the data complies with the data contract;

code that marshals or unmarshals the data based at least in part on the data contract;

code that executes the page generation code to generate at least a portion of the network page in response to the request, wherein the data that is aggregated is provided to the page generation code as the at least one predefined variable;

code that generates the network page including the at least a portion of the network page; and code that sends the network page to the client.

18. The non-transitory computer-readable medium of claim 17, wherein the page generation code comprises JavaServer Pages (JSP) code, and the data contract comprises web services description language (WSDL).

19. The non-transitory computer-readable medium of claim 17, wherein the data contract includes developer documentation.

20. The non-transitory computer-readable medium of claim 17, wherein the at least one program comprises a servlet container.

21. The non-transitory computer-readable medium of claim 17, wherein at least one of the plurality of data sources is configured to marshal a respective portion of the data based at least in part on an external data contract, and the data contract includes the external data contract.

* * * * *